April 22, 1958 W. P. OSBORN 2,831,502
UNITARY MEANS FOR OPERATING TWO PILOT VALVES
Filed Oct. 29, 1956 2 Sheets-Sheet 1

INVENTOR.

BY

April 22, 1958  W. P. OSBORN  2,831,502
UNITARY MEANS FOR OPERATING TWO PILOT VALVES
Filed Oct. 29, 1956  2 Sheets-Sheet 2

INVENTOR.

BY

United States Patent Office 2,831,502
Patented Apr. 22, 1958

2,831,502

UNITARY MEANS FOR OPERATING TWO PILOT VALVES

William P. Osborn, Tucson, Ariz., assignor to Infilco Incorporated, Tucson, Ariz., a corporation of Delaware Application October 29, 1956, Serial No. 618,944

5 Claims. (Cl. 137—622)

This invention relates to a pilot valve for positioning a pressure fluid operated reciprocable member, such as the piston of a pressure fluid cylinder, either directly or by the intermediary of a four-way fluid switch, and more particularly to a manually operated pilot valve of this type comprising two three-way valves operated by a single operating mechanism and capable of holding the reciprocable member in any desired position intermediate its end positions.

It is an object of this invention to provide an improved pilot valve for operating a pressure fluid operated reciprocable member which is simple in operation and economical in construction.

Another object is to provide a pneumatically operated pilot valve of this general type.

Another object is to provide means for operating a pressure fluid cylinder by means of two manually operated three-way valves in a manner that its piston can be held readily in any desired position intermediate its end positions.

Another object is to provide simple unitary means for manually operating two three-way valves.

Other objects will become apparent upon consideration of the detailed description and the claims which follow.

Because the pilot valve is particularly suited for the operation of a pressure fluid cylinder positioning a valve, such as a gate valve in a conduit, the invention will be described as applied to a pressure fluid cylinder. It will, however, be understood that the invention is not limited to this particular application, but can be used wherever it is desired to move a reciprocating member by pressure fluid between two end positions and to provide a hold position at any desired point between the end positions.

Pressure fluid cylinders, such as used for positioning gate valves in liquid conduits, are usually positioned by a four-way pilot valve or by two three-way pilot valves. Presently available pneumatically operated four-way valves are quite expensive and involve cumbersome structure. Three-way valves for pneumatic operation, on the other hand, are inexpensive and simple in structure. However, when using two three-way valves for positioning the piston of a pressure fluid cylinder, two operating mechanisms must be handled independently each time the position of the piston is to be changed. As long as only the end positions of the piston are involved, as when the piston is used to move a valve which should be always either fully open or fully closed, the inconvenience of manipulating two operating levers is relatively unimportant. When a hold position of the piston is required, however, it becomes practically impossible to stop the piston in a desired position by manipulating the operating mechanisms of two independent three-way valves.

To combine the advantage of a single valve operating mechanism with the desirable features of three-way valves, I suggest to synchronize two three-way valves in such manner that they can be positioned in unison by a single operating mechanism, and form, in effect, one four-way valve which has a mid position wherein pressure is applied to both sides of the cylinder piston and two end positions wherein pressure is admitted to one or the other side of the piston.

The invention will be understood more readily by reference to the drawings which form a part hereof and wherein.

Figure 1:
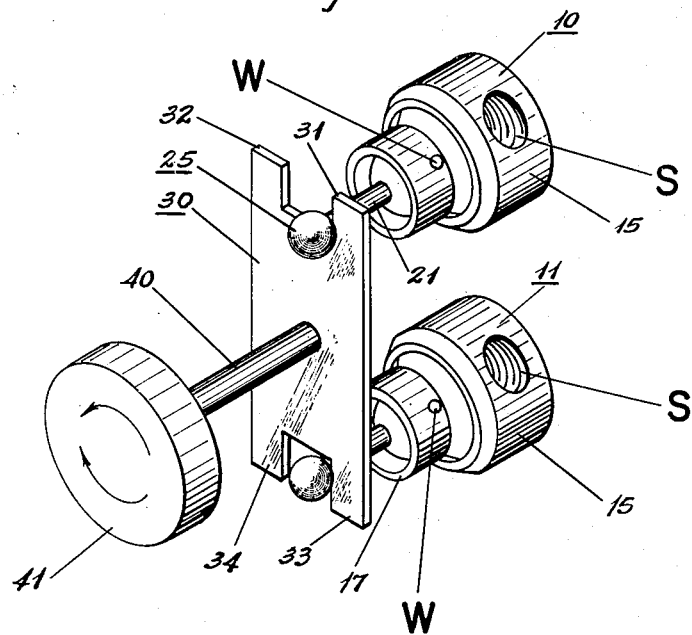
Figure 1 is a diagrammatic isometric view of a pilot valve according to the invention.

The three-way valves 10 and 11 shown in Figure 1 are toggle valves of known construction. One suitable valve, shown in Figure 5 for purposes of exemplification and illustration is sold by G. W. Dahl Company, Inc. under the trademark "Demi-TV3." However, the invention is not limited to the use of that specific valve, other toggle valves can be used.

Figure 5:
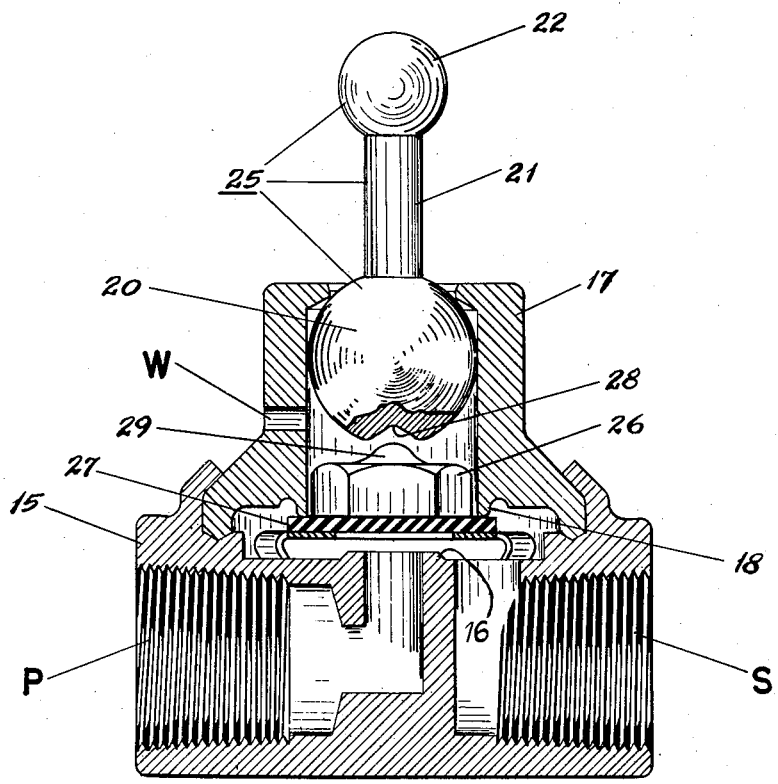
Figure 5 is a vertical sectional view, on an enlarged scale, of one form of a toggle valve which can be used in the pilot valve.

As best shown in Figure 5, each valve has a body 15 provided with a pressure port P and a diametrically opposite service port S. When the valves are installed the pressure ports P are connected to a source of fluid pressure, not shown, and the service ports S are connected to opposite sides of the piston of a pressure fluid cylinder, not shown. A valve seat 16 is formed in each body 15 between the respective pressure and service port, as shown. A bonnet 17 is affixed to the body 15 and is provided with a waste port W and a valve seat 18. A spherical member 20 is rotatable in the bonnet 17 and has a stem 21 which extends to outside the bonnet and has a knob 22 at its outer end. The member 20 and the stem 21 with its knob 22 form a toggle 25 which is supported by a thrust member 26 within the bonnet 17. The thrust member 26, in turn, rests on a valve disk 27, which is spring biased to seat on the valve seat 18 formed in the bonnet 17. The spherical member 20 has a cut-out portion 28 seating on the protruding button portion 29 of the thrust member 26.

When the toggle 25 is in its mid position, where the cut-out portion 28 is seated on button 29, the valve disk 27 is spring pressed against seat 18, as shown in Figure 5. In this position of the disk 27 the waste port W is sealed from the body 15 and through flow from pressure port P to service port S takes place. In this mid position, therefore, pressure fluid will be admitted to the side of the piston of the pressure fluid cylinder to which the respective service port is connected. When the toggle 25 is manipulated sidewise to a side or end position, the cut-out portion 28 of spherical member 20 is displaced from the button 29 and the valve disk 27 is depressed to seat on seat 16. In this position of disk 27 flow from the pressure port P to the service port S is prevented and simultaneously a connection is established for flow from the service port S to the waste port W. In this position of the valve, therefore, pressure fluid from the side of the piston of the pressure fluid cylinder to which the respective service port S is connected, will be exhausted through the respective waste port W. When the toggle thereafter is manipulated from its side position toward its mid position, the pressure on button 29 and valve disk 27 is relieved, whereupon the valve disk 27 returns to its spring biased position on seat 18 and the toggle snaps back to its mid position and seats with its cut-out portion 28 on button 29.

Referring now to Figure 1, the two valves 10 and 11 are rigidly mounted by any suitable means, not shown, in spaced parallel relationship. An H-shaped cam 30 is mounted at right angles to the horizontal axes (as seen in Figure 1) of valves 10 and 11. The stems 21 of the toggles 25 extend through the cam 30 between its upper and lower legs, 31—32 and 33—34, respectively.

Figure 3:
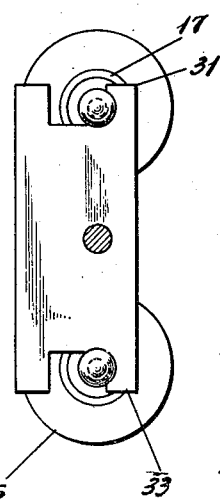

The cam 30 is mounted on a rotatable shaft 40 which is supported by any suitable bearing means, not shown, with its axis lying a plane passing through the axes of the toggle stems 21 in parallel relationship thereto and midway between the stems. On its free end the shaft 40 carries an operating knob 41. The shaft 40 is affixed to the cam 30 at a point just sufficiently offset from the vertical center line of the cam that each toggle 25, when it is in its mid position, touches a right hand leg, 31 or 33, of the cam, as shown in Figures 1 and 3. In this position of the cam 30 and toggles 25, pressure fluid is admitted to both sides of the pressure fluid cylinder and the cam 30, therefore, is in its "hold" position, where the cylinder is held in its then position.

Figure 2:
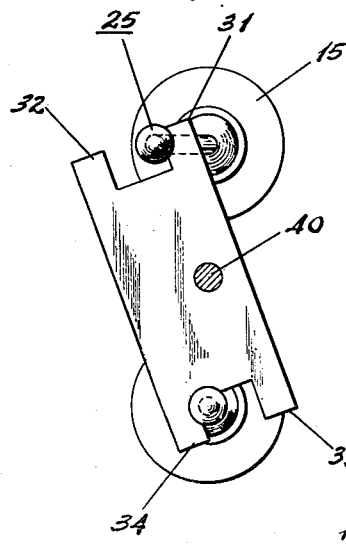
Figures 2, 3 and 4 are front views of the pilot valve of Figure 1, with the operating knob removed, showing the pilot valve in its one end position, in an intermediate position, and in its other end position, respectively.
Figure 4:
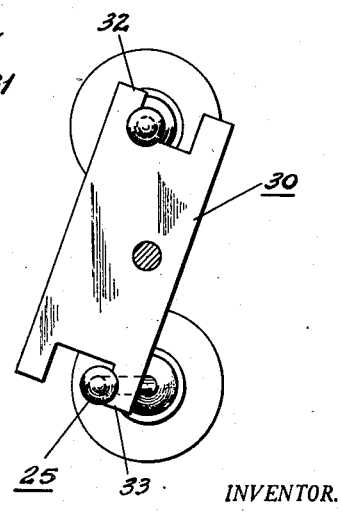

When the cam is rotated counterclockwise by counterwise turning of knob 41, the upper right hand leg 31 of cam 30 moves the upper toggle 25 to its side position as shown in Figure 2. Simultaneously, the lower right hand leg 33 of cam 30 pulls away from the lower toggle 25 and the lower left hand leg 34 moves to a position where it just touches the lower toggle but does not move it. The lower toggle, therefore, remains in its mid position. When the cam 30 is rotated clockwise from the position shown in Figure 2, its left hand upper leg 32 comes into contact with the upper toggle and moves it slightly, whereupon the upper toggle snaps back to its mid position. The lower right hand leg 33 of the cam comes into contact with the lower toggle 25 but does not move it from its mid position. This returns the cam 30 and toggles 25 to the position shown in Figure 3. Upon further clockwise rotation of the cam 30, the lower toggle is pushed by the lower right hand leg 33 of the cam to its side position, while the upper toggle remains in its mid position, as shown in Figure 4. When either the lower or upper toggle is in the side position, the service port S of the respective valve is connected to the waste port W, and the side of the pressure fluid cylinder piston to which the respective service port is connected is vented to atmosphere, resulting in a movement of the pitson in the corresponding direction.

It will be seen that I have devised a pilot valve assembly which solves the problem of pneumatic operation of a pressure fluid cylinder or other reciprocable element requiring a hold position in an economical and practical manner by retaining the desirable features of three-way valves, while still providing a unitary valve structure.

I claim:

1. A pilot valve for operating a reciprocable member comprising two three-way toggle valves of the type having each a pressure port, a service port and a waste port, said pressure ports being adapted for connection to a source of pressure fluid, said service ports being adapted for connection to opposite sides of the reciprocable member, and said waste ports being adapted for connection to atmosphere, said valves being mounted in axially aligned, spaced, parallel relationship and having in the mid position of their toggles their pressure ports connected to their service ports, and having in the side position of their toggles their service ports connected to their waste ports, a cam in operative relationship with said toggles, said toggles, in one position of said cam being both in their mid position, and means for rotating said cam clockwise and counterclockwise from said one position, said cam upon its clockwise rotation moving one of said toggles from its mid position to its side position and leaving the other toggle in its mid position, and, upon its counterclockwise rotation, moving the other toggle from its mid position to its side position and leaving said one toggle in its mid position.

2. In a pilot valve for operating a reciprocable member including two three-way toggle valves of the type having each a pressure port, a service port and a waste port, said pressure ports being adapted for connection to a source of pressure fluid, said service ports being adapted for connection to opposite sides of the reciprocable member, and said waste ports being adapted for connection to atmosphere, said valves being mounted in axially aligned, spaced, parallel relationship and having in the mid position of their toggles their pressure ports connected to their service ports, and having in the side position of their toggles their service ports connected to their waste ports, the combination with said toggles of a cam for moving said toggles, said cam having a position wherein both toggles are in their mid position, means for rotating said cam clockwise and counterclockwise from said one position, said cam upon its clockwise rotation moving one of said toggles from its mid position to its side position and leaving the other toggle in its mid position, and, upon its counterclockwise rotation, moving the other toggle from its mid position to its side position and leaving the one toggle in its mid position.

3. In a pilot valve for operating a reciprocable member, said pilot valve including two three-way toggle valves of the type having each a pressure port, a service port and a waste port, said pressure ports being adapted for connection to a source of pressure fluid, said service ports being adapted for connection to opposite sides of the reciprocable member, and said waste ports being adapted for connection to atmosphere, said valves being mounted in axially aligned, spaced, parallel relationship and having in the mid position of their toggles their pressure ports connected to their service ports, and having in the side position of their toggles their service ports connected to their waste ports, the combination with said toggles of an H-shaped cam mounted substantially at right angles to said toggles when in their mid position, said toggles extending between opposed pairs of legs of said cam, a rotatable shaft affixed to said cam with its longitudinal axis lying in a plane passing through the longitudinal axes of said toggles and being parallel to and midway between said toggles, said shaft being laterally offset with respect to said cam in such manner, that in the mid position of said toggles the legs of said cam on one side of said toggles contact said toggles, and means for rotating said shaft to swing said cam clockwise and counterclockwise, to move one of said toggles to its side position upon clockwise swinging of said cam and leave the other toggle in its mid position, and to move the other toggle to its side position upon counterclockwise swinging of said cam and leave said one toggle in its mid position.

4. In a pilot valve for operating a reciprocable member including two three-way toggle valves of the type having each a pressure port, a service port and a waste port, said pressure ports being adapted for connection to a source of pressure fluid, said service ports being adapted for connection to opposite sides of the reciprocable member, and said waste ports being adapted for connection to atmosphere, said valves being mounted in axially aligned, spaced, parallel relationship and having in the mid position of their toggles their pressure ports connected to their service ports, and having in the side position of their toggles their service ports connected to their waste ports, the combination with said toggles of a cam comprising a rotatable member, said member being mounted at right angles to and laterally offset from the plane through which said toggles extend in their mid position, said member having one portion closely adjacent one of said toggles when said toggle is in its mid position and, upon its clockwise rotation moving said one toggle to its side position, and having another portion closely adjacent the other toggle when said other toggle is in its mid position and upon its counterclockwise rotation moving said other toggle to its side position, and means for rotating said member clockwise and counterclockwise.

5. In a pilot valve for operating a reciprocable member including two three-way toggle valves of the type having each a pressure port, a service port and a waste port, said pressure ports being adapted for connection to a source of pressure fluid, said service ports being adapted for connection to opposite sides of the reciprocable member, and said waste ports being adapted for connection to atmosphere, said valves being mounted in axially aligned, vertically spaced, parallel relationship, with their toggles extending horizontally, and having in the mid position of their toggles their pressure ports connected to their service ports, and having in the side position of their toggles their service ports connected to their waste ports, the combination with said toggles of a rotatable H-shaped cam, said cam being mounted for rotation about a horizontal eccentric axis lying parallel to and intermediate said toggles in their mid position, and in such relation to said toggles that said toggles extend between upper and lower pairs of legs of said cam, respectively, and, when in their mid position, are adjacent the upper and lower leg, respectively, on one side of said cam and means for swinging said cam clockwise and counterclockwise to move one of said toggles to its side position upon clockwise swinging of said cam and leave the other toggle in its mid position, and to move the other toggle to its side position upon counterclockwise swinging of said cam and leave said one toggle in its mid position.

No references cited.

UNITED STATES PATENT OFFICE
CERTIFICATE OF CORRECTION

Patent No. 2,831,502                                              April 22, 1958

William P. Osborn

It is hereby certified that error appears in the printed specification of the above numbered patent requiring correction and that the said Letters Patent should read as corrected below.

Column 3, line 8, after "lying" insert -- in --; line 21, for "wise" read -- clockwise --; column 6, line 8, after "cam", first occurrence, insert a comma.

Signed and sealed this 2nd day of June 1959.

(SEAL)
Attest:
KARL H. AXLINE
Attesting Officer

ROBERT C. WATSON
                                                                                Commissioner of Patents